United States Patent Office 3,051,765
Patented Aug. 28, 1962

3,051,765
CHEMICAL PROCESS FOR PREPARING
FULVENE COMPOUNDS
George H. McCain, Painesville, Ohio, assignor to Diamond Alkali Company, Cleveland, Ohio, a corporation of Delaware
No Drawing. Filed Mar. 30, 1959, Ser. No. 802,595
7 Claims. (Cl. 260—666)

This invention relates to improvements in the method for preparing fulvenes and more particularly relates to improvements in the method for preparing fulvenes by the condensation reaction of a cyclopentadiene with a aldehyde or a ketone.

The class of organic compounds known as fulvenes, i.e., compounds characterized by the generic structure

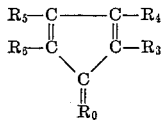

wherein $R_0$ is selected from the group consisting of cyclic aliphatic radicals and

and $R_1$ through $R_6$ are selected from the group consisting of alkyl, aryl, aralkyl and alkaryl radicals, hydrogen and the halogens, are of considerable interest, not only because of the characteristics of the compounds themselves, but also because of the possible uses to which these compounds may be put. Of primary importance is the fact that the fulvenes undergo homo and copolymerization and, hence, are potentially useful in forming a new class of polymers. Additionally, because of their strong affinity for oxygen, they also possess potential as antioxidants. In addition to the above, the fulvenes have an important place in the theory of color, being among the first colored hydrocarbons which were known. However, in the more than 50 years since these compounds were first prepared, only a few of these compounds, particularly dimethyl fulvene, have been prepared with any appreciable success. Thus, for the most part, the potential of the fulvenes has been virtually neglected.

Generally, the fulvenes are most simply prepared by condensing cyclopentadiene with an aldehyde or a ketone in the presence of a base which acts as a catalyst. The bases which have been used as catalysts have been selected from the common organic and inorganic bases such as, ammonia, the hydroxides of sodium and potassium and the alcoholates of sodium and potassium. Although when using these basic catalysts in the above reaction, a fulvene is formed, resinification of the fulvene occurs rapidly so that, generally, only tars are isolable as products of the reaction. Moreover, even when preparing dimethyl fulvene, with which appreciable resinification apparently does not take place, the presence of the conventionally used bases causes complications in the isolation and purification of the product.

It has now been found, in the practice of the present invention that the difficulties of the prior art processes can be overcome by substituting an anionic exchange resin for the conventionally used basic catalysts in the condensation reaction for the preparation of fulvenes.

It is, therefore, an object of the present invention to provide a method for preparing fulvenes wherein the prior art difficulties of product resinification, isolation and purification, caused by the use of conventional bases as a catalyst for the reaction, are overcome.

Other objects of the present invention will become apparent to those skilled in the art from the description of the invention which follows:

The method of the present invention envisions preparing compounds having the generic structure

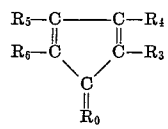

wherein $R_0$ is selected from the group consisting of cyclic aliphatic radicals and

and $R_1$ through $R_6$ are selected from the group consisting of alkyl, aryl, aralkyl and alkaryl radicals, hydrogen and the halogens, by reacting a compound having the generic structure

with a compound having the generic formula

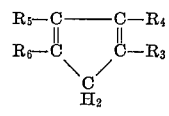

wherein $R_0$ is selected from the group consisting of cyclic aliphatic radicals and

and $R_1$ through $R_6$ are as defined hereinabove, in the presence of an anionic exchange resin as a catalyst.

More specifically, in the method of the present invention a compound of the general formula

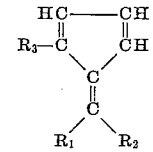

wherein $R_1$, $R_2$, and $R_3$ are selected from the group consisting of alkyl, aryl, aralkyl and alkaryl radicals, hydrogen and the halogens, is prepared by reacting a compound of the general formula

with a compound of the general formula

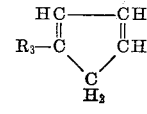

wherein $R_1$, $R_2$, and $R_3$ are as defined hereinabove, in the presence of an anionic exchange resin, as a catalyst.

In general, any aldehyde or ketone may be condensed with any cyclopentadiene, in the presence of an anionic exchange resin as a catalyst, to form the fulvenes. Specific examples of the aldehydes, ketones and cyclopentadienes which can be so reacted are the following:

| Column I—Aldehydes and Ketones | Column II—Cyclopentadienes |
|---|---|
| formaldehyde. | methyl cyclopentadiene. |
| acetaldehyde. | dimethyl cyclopentadiene. |
| propionaldehyde. | trimethyl cyclopentadiene. |
| butylaldehyde. | tetramethyl cyclopentadiene. |
| valeraldehyde. | chloro cyclopentadiene. |
| caproicaldehyde. | dichloro cyclopentadiene. |
| heptaldehyde. | trichloro cyclopentadiene. |
| caprylaldehyde. | tetrachloro cyclopentadiene. |
| acrylaldehyde. | ethyl cyclopentadiene. |
| crotonaldehyde. | butyl cyclopentadiene. |
| propargylaldehyde. | amyl cyclopentadiene. |
| benzaldehyde. | phenyl cyclopentadiene. |
| tolualdehyde. | p-methyl phenyl cyclopentadiene. |
| naphthaldehyde. | p-ethyl phenyl cyclopentadiene. |
| phenylacetaldehyde. | phenyl methyl cyclopentadiene. |
| cinnamaldehyde. | phenyl ethyl cyclopentadiene. |
| dimethyl ketone. | |
| methyl ethyl ketone. | |
| diethyl ketone. | |
| methyl propyl ketone. | |
| methyl butyl ketone. | |
| ethyl propyl ketone. | |
| dipropyl ketone. | |
| methyl amyl ketone. | |
| dibutyl ketone. | |
| diamyl ketone. | |
| dihexyl ketone. | |
| diheptyl ketone. | |
| acetophenone. | |
| benzophenone. | |
| cyclohexanone. | |
| cyclohexenone. | |

It will be appreciated that any of the compounds in Column I may be reacted with any of the compounds in Column II in the presence of an anionic exchange resin as a catalyst, to form the fulvenes, according to the method of the present invention.

It is believed that the term "anionic exchange resin" is well known to those skilled in the art as referring to a basic synthetic resin having ion exchange characteristics. Such materials are generally formed by the copolymerization of an amine and formaldehyde, of a polyamine, phenol and formaldehyde, of guanidine and formaldehyde or of styrene and divinyl benzene, and have quaternary ammonium functional groups, which groups impart the basic characteristic to the resins. Examples of anionic exchange resins of this type are the following: Amberlite IRA–400 (trademark of the Rohm & Haas Company) which is a strongly basic polystyrene quaternary amine type anion exchange resin, Permutit-A (trademark of the Permutit Company) which is a moderately basic tertiary amine anion exchange resin and Dowex 1–X10 (trademark of the Dow Chemical Company) which is a fine mesh, strongly basic copolymer of styrene and divinyl benzene having quaternary ammonium functional groups and containing about 10% divinyl benzene. Although the above specific anionic exchange resins have been found to be satisfactory when used in the method of the present invention, it will be appreciated that any of the other well known anionic exchange resins may also be used with equally good results.

In the practice of the present method, the mixture of the reactants, i.e., the acetone or ketone and the cyclopentadiene material, is agitated in contact with the anionic exchange resin for a period of time sufficient to form the desired fulvene. The length of time for the reaction will vary from a few minutes up to seven or more hours, depending upon which reactants are used and the fulvene which is prepared. During this time, the reaction temperature is maintained within the range of about 50° to −20° C., generally, about 0° to 15° C. It has been found, that the best results are obtained when the reactants, i.e., the aldehyde or ketone and the cyclopentadiene material, are added in equimolar amounts or preferably with a slight excess of the cyclopentadiene material.

It will be appreciated that the contact between the reactants and the anionic exchange resin catalyst may be brought about in any convenient manner. Thus, if the fulvenes are being prepared as in a batch process, the anionic exchange resin in finely divided form is added to the reaction mixture in the reaction vessel and the resulting mixture agitated in any well known manner. Where the fulvene preparation is run as a continuous process, the anionic exchange resin catalyst is placed in a column and the mixture of reactants is passed through the column in contact with the catalyst. When using such a process, the desired contact time between the reactants and the catalyst is obtained either by varying the feed rate of the reactants, when the reaction time is relatively short, or by recycling the reaction mixture through the column several times, when a longer reaction time is necessary. Thus, when the proper reaction time has been obtained, the fulvene product can be removed from contact with the catalyst immediately before the base catalyzed resinification of the fulvene takes place. It should further be noted, that even when operating in a batch process, the anionic exchange resin catalyst is readily removed from the reaction mixture at the proper time by simple filtration.

After the reaction mixture has been removed from contact with the catalyst, the desired fulvene product is recovered from the reaction mixture by distillation or fractionation. Inasmuch as the catalyst has been completely removed from the reaction mixture prior to the separation and purification steps, this portion of the process has been found to be greatly simplified. Additionally, not only is the separation and purification of the fulvene product simplified, but by the present method, wherein the anionic exchange resin is used as the catalyst, many fulvenes can be made whose preparation was not heretofore possible.

In order that those skilled in the art may better understand the method of the present invention and the manner in which it may be practiced, the following specific examples are given. In all the following examples, the anionic exchange resins used are washed with a 20% aqueous solution of potassium hydroxide to generate the basic form of the resin, following which the resins are washed thoroughly with distilled water. The resins are then washed with methanol, dried under reduced pressure at room temperature and the dried resins stored under nitrogen until they are used.

*Example I*

44 grams (0.67 mol) of cyclopentadiene are cooled to 0° C. in a 250 ml. glass-stoppered flask and 23 grams of Dowex 1–X10 and 29 grams (0.5 mol) of acetone are added rapidly thereto. The temperature of the mixture is permitted to rise slowly to about 25° C. and after 1.5 hours, a vigorous exothermic reaction begins. The flask is agitated until the temperature begins to fall and the reaction subsides, about 10 minutes. The mixture is then allowed to stand at 25° C. for eight hours. The Dowex 1–X10 is removed by filtration and thoroughly washed with ether, the washing being combined with the original filtrate. Ether and unreacted starting materials are removed by distillation at 80 mm. pressure and the residue is held at 30° C. and 10 mm. pressure for 1.5 hours. The residue is then fractionated through a column packed with Berl saddles and 29.7 grams of the bright yellow dimethyl fulvene, boiling within the range of 41.5 to 45.5° C. at 10 mm. pressure, is obtained.

*Exampl II*

A mixture of 22 grams (0.5 mol) of acetaldehyde and 44 grams (0.67 mol) of cyclopentadiene is introduced into the top of a 10 x 270 mm. column packed with Permutit A, which column is surrounded by a jacket containing circulating methanol cooled to between −22° and −24° C. The rate of addition of the reactants is adjusted so that the reactants are in contact with the resin for 1.25 hours, the reaction mixture being recycled through the column until a total reaction time of 7 hours is achieved. The unreacted starting materials are removed at room temperature by distillation at 17 mm. pressure. The distilland is then warmed to 25° C. and the pressure lowered to 0.75 mm., and 16.3 grams of a bright yellow distillate is collected without applying heat to the distillation flask. The ultraviolet absorption spectrum of this distillate in methanol indicates the formation of the desired methyl fulvene product.

*Example III*

In a 300 ml. three neck flask equipped with a stirrer, thermometer, reflux condenser, and addition funnel, are placed 19.8 g. (0.30 mol) of cyclopentadiene and 10 g. of Dowex 1-X10. The mixture is cooled to 0° C. and 14.5 g. (0.25 mol) of propionaldehyde is added over a period of 15 minutes while the temperature is permitted to rise to between 10° and 12° C. After agitation for an additional 10 minutes, the mixture is warmed to 25° C. and the anionic exchange resin catalyst is removed from the reaction mixture by filtration. The filtrate which is red-orange in color is transferred to a 50 ml. distillation flask, 3 g. of anhydrous magnesium sulfate are added and the low boiling material is removed at 20 mm. pressure using a water bath at a temperature between 40°–50° C. as the heat source. After thus heating the material for three hours, the material remaining in the flask is filtered to yield 14 g. of an orange oil, which oil upon analysis by ultraviolet absorption indicates the formation of the desired ethyl fulvene.

*Example IV*

A mixture of 18.7 g. of a 40% aqueous solution of formaldehyde (equivalent to 0.25 mol of formaldehyde), 70 ml. of methanol and 19.8 g. (0.3 mol) of cyclopentadiene are introduced in the top of a 20 x 150 mm. column packed with Amberlite IRA 400. The reactants are added to the column at a rate such that the contact time with the catalyst is about 30 seconds, the reaction mixture being recirculated through the column until a total contact time of one hour is obtained. During this time the temperature of the column is maintained at 5° C. after removing the material from the column, it is permitted to separate into an aqueous layer and an oil layer. The aqueous layer is extracted five times with 10 ml. portions of ether, the extracts being combined with the original oil layer. The resulting mixture is dried over magnesium sulfate, and the solvent and other low boiling material removed by distillation at reduced pressure as described in the preceding example. 5.3 g. of an orange product are obtained whose ultraviolet absorption spectrum indicates the formation of the desired fulvene.

*Example V*

54 g. (0.67 mol) of methyl cyclopentadiene is placed in a glass stoppered Erlenmeyer flask and cooled to 0° C. 30 g. of Dowex 1-X10 resin and 29 g. (0.5 mol) of propionaldehyde are added to the flask. The flask is agitated causing a vigorous reaction therein, which reaction lasts for five minutes. Following this time the mixture is allowed to stand at 0° to 5° C. with gentle agitation for a period of two hours, after which time the resin catalyst is removed by filtration. The low boiling materials are flashed off from the filtrate as in the previous example and a high boiling red liquid is obtained. This liquid is subjected to distillation at room temperature and 0.5 mm. pressure. When no more red material distills at this temperature, the distillation temperature is raised to between 40° and 70° C. and the distillate collected. A reddish orange product is obtained whose ultraviolet absorption spectrum indicates the formation of the desired ethyl methyl fulvene.

*Example VI*

45 g. (0.67 mol) of cyclopentadiene are placed in a glass-stoppered Erlenmeyer flask and cooled to 0° C. 30 g. of Dowex 1–X10 are added to the cyclopentadiene and 35 g. (0.5 mol) of crotonaldehyde are added over a fifteen minute period. The mixture is stirred for 10 minutes and the resin catalyst is then removed by filtration. The low boiling materials are flashed from the filtrate at 15 mm. pressure as in the preceding example, and a deep red liquid having a boiling point of 172° C. is obtained. The ultraviolet absorption spectrum of this material indicates the formation of the desired 1-propenyl fulvene.

Although particular emphasis has been placed hereinabove on the fulvenes prepared by the condensation of an aldehyde or ketone and cyclopentadiene, it should be appreciated that the method of the present invention is also applicable to the preparation of benzo-fulvenes. Such compounds are prepared by the condensation of an aldehyde or a ketone and a fused ring cyclopentadiene, such as indene or the like. This reaction, like that for the preparation of the simple fulvenes, is found to be catalyzed by an anionic exchange resin and hence is intended to be included in the present method.

While there have been described various embodiments of the invention, the methods described are not intended to be understood as limiting the scope of the invention, as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of preparing a fulvene compound which comprises reacting approximately equimolar amounts of cyclopentadiene and a compound selected from the group consisting of aldehydes and ketones in the presence of an anionic exchange resin at a temperature in the range of about −20° C. to 50° C. and at atmospheric pressure, separating the reaction mixture from the ion exchange catalyst and distilling the reaction mixture to recover the desired fulvene.

2. The method of preparing fulvene which comprises reacting approximately equimolar amounts of cyclopentadiene and formaldehyde in the presence of an anionic exchange resin at a temperature of about 5° C. for a period of about 1 hour, separating the reaction mixture from the ion exchange resin, distilling the reaction mixture at a pressure of approximately 20 mm. mercury and recovering the fulvene.

3. The method of preparing methyl fulvene which comprises reacting approximately equimolar amounts of cyclopentadiene and acetaldehyde in the presence of an anionic exchange resin at a temperature of about 0° to −20° C. for a period of about 7 hours, separating the reaction mixture from the ion exchange catalyst and distilling the reaction mixture at a pressure of about 0.75 to 17 mm. mercury and recovering the methyl fulvene.

4. The method of preparing ethyl fulvene which comprises reacting approximately equimolar amounts of cyclopentadiene and propionaldehyde in the presence of an anionic exchange resin catalyst at a temperature in the range of 0° C. to 25° C. for a period of about 25 minutes, separating the reaction mixture from the ion exchange resin, distilling the reaction mixture at a pressure of approximately 20 mm. mercury and recovering the ethyl fulvene.

5. The method of preparing ethyl methylfulvene which comprises reacting approximately equimolar amounts of methyl cyclopentadiene and propionaldehyde in the presence of an anionic exchange resin catalyst at a temperature of about 0° C. to 5° C. for a period of about 2 hours, separating the reaction mixture from the ion exchange resin, distilling the reaction mixture at a pressure of approximately 0.5 mm. mercury and recovering the ethyl methylfulvene.

6. The method of preparing 1-propenyl fulvene which comprises reacting approximately equimolar amounts of cyclopentadiene and crotonaldehyde in the presence of an anionic exchange resin at a temperature of about 0° C. for a period of about 25 minutes, separating the reaction mixture from the ion exchange resin, distilling the reaction mixture at a pressure of approximately 15 mm. mercury and recovering the 1-propenyl fulvene.

7. The method of preparing dimethyl fulvene which comprises reacting approximately equimolar amounts of cyclopentadiene and acetone in the presence of an anionic exchange resin catalyst at a temperature in the range of 0° C. to 25° C. for a period of about 9 to 10 hours, separating the reaction mixture from the ion exchange resin, distilling the reaction mixture at a pressure of about 10 mm. mercury and recovering the dimethyl fulvene.

References Cited in the file of this patent

UNITED STATES PATENTS

| | | |
|---|---|---|
| 1,728,732 | Jaeger | Sept. 17, 1929 |
| 2,317,803 | Reeves et al. | Apr. 27, 1943 |
| 2,589,969 | Schutze et al. | Mar. 18, 1952 |
| 2,802,884 | D'Alelio | Aug. 13, 1957 |
| 2,826,614 | Whitfield | Mar. 11, 1958 |
| 2,843,642 | Kelly | July 15, 1958 |
| 2,898,325 | Fusco et al. | Aug. 4, 1959 |

OTHER REFERENCES

"Ion Exchange Resins as Catalysts," The Chemical Age, vol. 68, No. 761, April 11, 1953, pages 561–564.